Patented Jan. 3, 1933

1,892,730

UNITED STATES PATENT OFFICE

GEORG KRAENZLEIN, OF FRANKFORT-ON-THE-MAIN, ROBERT WELDE, DECEASED, LATE OF FRANKFORT-ON-THE-MAIN-HOCHST, BY ANNA WELDE, ADMINISTRATRIX, OF FRANKFORT-ON-THE-MAIN, AND PAUL OCHWAT, OF FRANKFORT-ON-THE-MAIN, GERMANY, ASSIGNORS TO GENERAL ANILINE WORKS, INC., OF NEW YORK, N. Y., A CORPORATION OF DELAWARE

PROCESS OF PREPARING DERIVATIVES OF THE NAPHTHAZARINE SERIES

No Drawing. Application filed November 5, 1930, Serial No. 493,686, and in Germany November 23, 1929.

The present invention relates to a process of preparing derivatives of the naphthazarine series.

As is known, easily decomposable compounds which are known in literature as "naphthazarine intermediate products" are obtainable by treating an alpha-alpha dinitronaphthalene, such as 1.8- or 1.5-dinitronaphthalene, with sulfuric acid in the presence of a reducing agent (cf., for instance, German Patents Nos. 76,922; 108,551, British Patents Nos. 3828/1894 and 890/1900 or U. S. Patent No. 667,486).

In the co-pending application Ser. No. 379,065 filed in the name of Georg Kränzlein and Robert Welde, on July 17, 1929, it is furthermore disclosed that the said "naphthazarine intermediate products" can be converted into new condensation products by causing an aliphatic aldehyde to react with one of the said "naphthazarine" intermediate products" in an aqueous medium.

According to the present invention, the said condensation products are obtainable by causing an aliphatic aldehyde, such as formaldehyde or acetaldehyde, to act upon a solution of one of the said "naphthazarine intermediate products" in sulfuric acid. Inasmuch as the said sulfuric acid solutions are directly obtained when preparing the "naphthazarine intermediate products" according to the processes disclosed in the above mentioned patents, our process represents an advantageous manner of manufacture. The condensation products can be isolated, for instance, by pouring the reaction mass into water after the condensation has taken place.

The following example serves to illustrate the invention but it is not intended to limit it thereto, the parts being by weight:

8 parts of 1.5-dinitronaphthalene are treated with sulfur in the presence of 100 parts of concentrated sulfuric acid according to one of the processes disclosed in the above mentioned patents. The solution thus obtained containing the naphthazarin intermediate product of the probable formula:

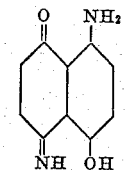

is filtered by means of a suction stone filter, stirred with solid paraformaldehyde until the red brown color of the solution has been superseded by a deep cyanean blue and stirring is continued for 24 hours. The whole is then poured into water, boiled, filtered and the solid matter is washed. There is obtained a black pigment which dissolves in concentrated sulfuric acid to a red brown solution.

We wish to be understood that the term "naphthazarine intermediate products" whenever used in the claims hereafter is intended to comprise the products obtainable by treating an alpha-alpha-dinitronaphthalene, such as 1.5- or 1.8-dinitronaphthalene with sulfuric acid in the presence of a reducing agent according to the patents mentioned in the specification.

What is claimed is:—

1. The process which comprises causing a saturated aldehyde of the lower aliphatic series to act upon a solution of a naphthazarine intermediate product obtainable by treating a compound of the group consisting of 1.5- and 1.8-dinitronaphthalene with sulfuric acid in the presence of a reducing agent according to known processes in sulfuric acid.

2. The process which comprises causing a saturated aldehyde of the lower aliphatic series to act upon a solution of the naphthazarine intermediate product derived from 1.5- dinitronaphthalene and having the probable formula:

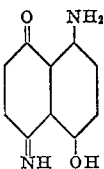

in sulfuric acid.

3. The process which comprises causing paraformaldehyde to act upon a solution of the naphthazarine intermediate product derived from 1.5 dinitronaphthalene and having the probable formula:

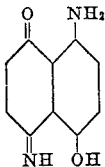

in sulfuric acid.

In testimony whereof, we affix our signatures.

GEORG KRAENZLEIN.
ANNA WELDE,
*Administratrix of Robert Welde, Deceased.*
PAUL OCHWAT.